United States Patent
Katoh et al.

(12)

(10) Patent No.: US 6,305,519 B1
(45) Date of Patent: Oct. 23, 2001

(54) VISCOUS FLUID COUPLING

(75) Inventors: Hirofumi Katoh; Shinichi Kawada; Kenzi Ohhara; Yasuo Fujita, all of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/288,716

(22) Filed: Apr. 9, 1999

(30) Foreign Application Priority Data

Apr. 9, 1998 (JP) .................................................. 10-097291
Apr. 9, 1998 (JP) .................................................. 10-097293

(51) Int. Cl.[7] ..................................................... F16D 31/00
(52) U.S. Cl. ........................... 192/58.682; 464/24; 464/26
(58) Field of Search ................................. 464/28, 24, 26; 192/58.2, 58.6, 58.61, 58.62, 58.63, 58.64, 58.65, 58.66, 58.67, 58.68, 58.681, 58.682, 58.684, 58.683

(56) References Cited

U.S. PATENT DOCUMENTS

| 2,337,976 | * | 12/1943 | Davis | 464/24 |
| 4,633,994 | * | 1/1987 | Light | 192/58.63 X |
| 4,790,792 | * | 12/1988 | Bopp | 464/24 X |
| 4,913,273 | * | 4/1990 | Mader | 192/58.682 |
| 5,044,477 | | 9/1991 | Bojas et al. . | |
| 6,085,881 | * | 7/2000 | Robb | 192/58.682 |

FOREIGN PATENT DOCUMENTS

| 2718723 | 11/1977 | (DE) . |
| 2814468 | 10/1978 | (DE) . |
| 3307566 | 9/1983 | (DE) . |
| 4205225 | 9/1992 | (DE) . |
| 42 23 678 | 1/1993 | (DE) . |
| 93 17 085 | 2/1994 | (DE) . |
| 0070111 | 1/1983 | (EP) . |
| 0106 581 | 4/1984 | (EP) . |
| 0870943 | 10/1998 | (EP) . |
| 57-204491 | 12/1982 | (JP) . |
| 59-128933 | 8/1984 | (JP) . |
| 1-83925 | 6/1989 | (JP) . |
| 3-77825 | 8/1991 | (JP) . |

OTHER PUBLICATIONS

Merriam–Webter's Collegiate Dictionary, 10th ed., Merriam–Webster, Inc., Springfield MA, 1997, p. 538.*

* cited by examiner

Primary Examiner—Lynne H. Browne
Assistant Examiner—Greg Binda
(74) Attorney, Agent, or Firm—Foley & Lardner

(57) ABSTRACT

A viscous fluid coupling includes a housing rotatably supported to a drive shaft of an engine. An operation plate set in the housing divides a space of the housing into a reservoir and an operation chamber. The operation plate has a communication hole communicating the reservoir and the operation chamber. A rotor fixed to the drive shaft is disposed in the operation chamber. A valve mechanism installed to the operation plate to close and open the communication hole according to ambient temperature of the housing. A driven wheel fixed to the housing is located between the operation plate and the rotor. A torque transmitting section includes a first annular projection concentrically formed on the driven wheel and a plurality of second annular projections concentrically formed on the rotor. The first annular projections are overlappedly adjacent to the second annular projections so as to establish fluid coupling therebetween through the viscous fluid.

17 Claims, 15 Drawing Sheets

14 → 14D

VISCOUS FLUID COUPLING

BACKGROUND OF THE INVENTION

The present invention relates to a viscous fluid coupling adapted to drive an accessory device, such as a cooling fan, for an internal combustion engine.

Japanese Utility Model Provisional Publications Nos. 57-204491 and 3-77825 disclose viscous fluid coupling adapted to a cooling fan for an internal combustion engine. As shown in FIGS. 21 and 22, this conventional viscous fluid coupling 100 includes a housing 104 relatively rotatable with a drive shaft 102, an operation plate 108 dividing a space in the housing 104 into a reservoir 105 and an operation chamber 106, a rotor 109 disposed in the operation chamber 106 and fixed to the drive shaft 102 and a valve mechanism 111 disposed at an outer peripheral portion of the rotor 109. The housing 104 is constituted by a housing body member 121 supported by the drive shaft 102 and a cover member 122 fixed to the housing body member 121. The cover member 122 includes a circular recess portion 123 for defining the operation chamber 105 and a ring-shaped flange portion 125 having a return passage 124. The operation plate 108 is made of metal and formed into a disc shape. The operation plate 108 is connected to the flange portion 124 of the cover member 122 by means of caulking so as to close an opening of the recess portion 123 of the cover member 122. A torque transmitting section 110 is constituted by a plurality of annular projections 127 concentrically formed on the cover member 122 and a plurality of annular projections 128 concentrically formed on the rotor 109 so that the annular projections 127 and 128 are overlapped with each other.

When the ambient temperature around the housing is low, the communication hole 107 formed on the operation plate 108 is closed by the valve mechanism 111 to stop flowing the viscous fluid from the reservoir 105 to the operation chamber 106. Therefore, the torque transmission amount from the rotor 109 to the housing 104 is lowered to stop or rotate a cooling fan in low speed. When the ambient temperature around the housing is high, the communicated hole is opened by the operation of the valve mechanism 111 to flow the viscous fluid from the reservoir 105 to the operation chamber 106. Therefore, the torque transmission amount from the rotor 109 to the housing 104 is increased to rotate the cooling fan in high speed.

However, this conventional viscous fluid coupling 101 has problems. For example, since the torque transmitting section 110 is formed by locating the annular projections 127 and the annular projections 128 adjacent to the other, it is necessary to locate the torque transmitting section 110 on an outer peripheral portion of the cover member 122. That is, because the operation plate 108 is installed at a central portion of the cover member 122, it is impossible to locate the annular projections 127 at an inner position corresponding to the operation plate 108. Further, since the torque transmitting section 110 is formed at an outer side as compared with an inner surface defining the reservoir 105, that it, since the reservoir 105 is located at a height which is gravitationally lower than that of the torque transmitting section 110, the torque transmitting section 110 becomes dipped in (viz., becomes at least partially immersed in or coated with) the viscous fluid when the engine is stops. This dipping of the torque transmitting section 110 generates a dragging-rotation phenomenon of the cooling fan when the engine is started. Although Japanese Utility Model Provisional Publications Nos. 59-128933 and 1-83925 have proposed another conventional viscous fluid coupling arranged to prevent such a fan dragging-rotation phenomenon, this conventional viscous fluid coupling has generated another problem that the utility of the viscous fluid is degraded.

SUMMARY OF THE PRESENT INVENTION

A viscous fluid coupling according to the present invention is connected to an engine. The viscous fluid coupling comprises a drive shaft connected to a rotation shaft of the engine. A housing is rotatably supported to the drive shaft. An operation plate is set in the housing so as to divide a space defined by the housing into a reservoir and an operation chamber. The operation plate has a communication hole communicating the reservoir and the operation chamber. Viscous fluid is stored in the reservoir and the operation chamber. A rotor is disposed in the operation chamber and is fixed to the drive shaft. A valve mechanism closes and opens the communication hole according to ambient temperature of the housing to control a flow rate of the viscous fluid from the reservoir to the operation chamber. A driven wheel is fixed to the housing so as to be located between the operation plate and the rotor. A torque transmitting section includes a plurality of first annular projections concentrically formed on an outer peripheral portion of the driven wheel and a plurality of second annular projections concentrically formed on an outer peripheral portion of the rotor. The first annular projections are overlappedly adjacent to the second annular projections so as to be fluidly coupled with each other through the viscous fluid.

BRIEF DESCRIPTION OF DRAWINGS

In the drawings, like reference numerals denote like parts and elements throughout all figures, in which.

DETAILED DESCRIPTION OF THE INVENTION

Figure 1:
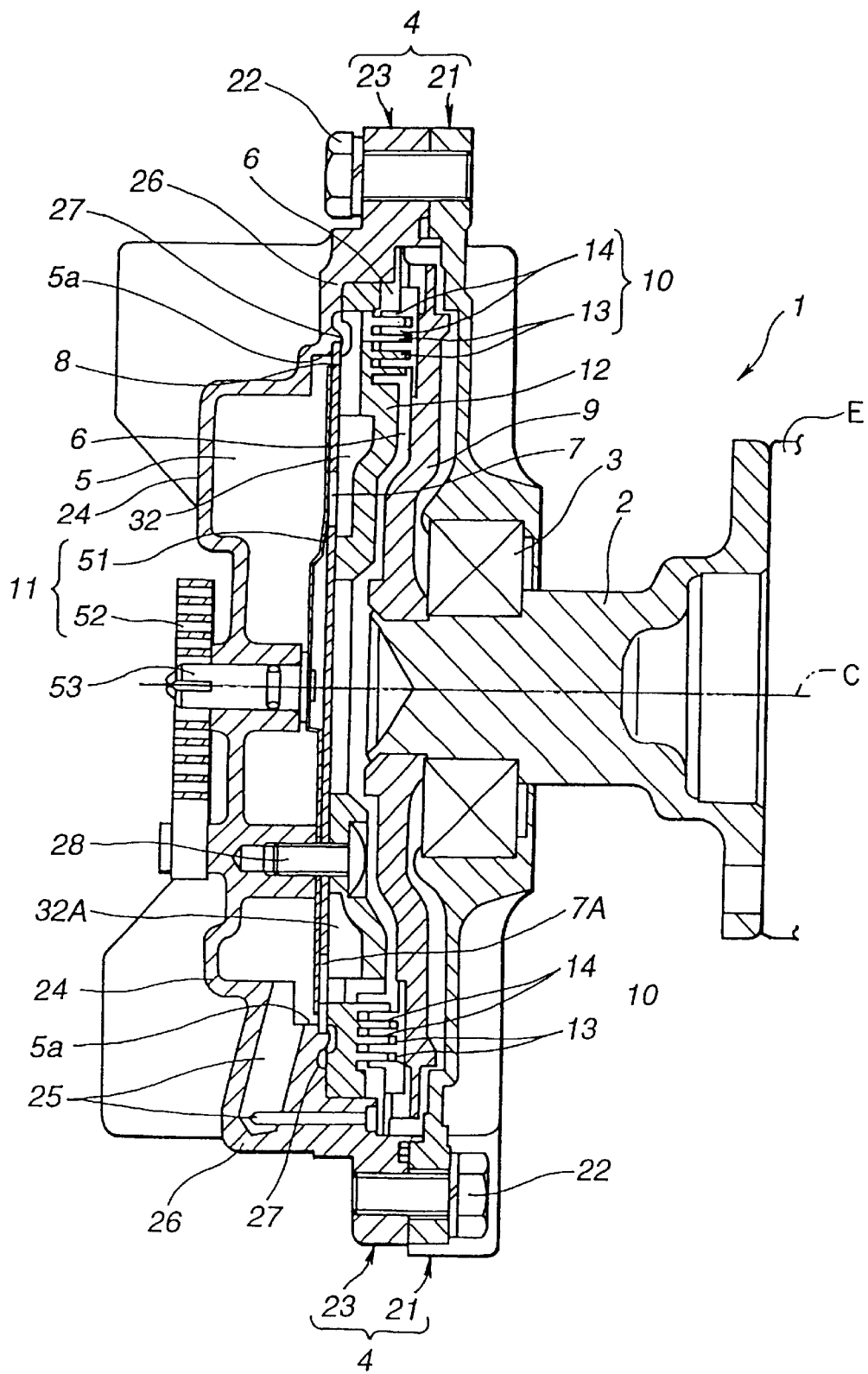
FIG. 1 is a cross-sectional view of a viscous fluid coupling of a first embodiment according to the present invention.

Referring to FIGS. 1 to 9, there is shown a first embodiment of a viscous fluid coupling 1 according to the present invention. The viscous fluid coupling 1 is adapted to drive a cooling fan (not shown) for an internal combustion engine E. The viscous fluid coupling 1 comprises a housing 4 which is rotatably supported to a drive shaft 2 through a bearing 3, an operation plate 8 for controlling a fluid communication between a reservoir 5 and an operation chamber 6 defined in the housing 4, a rotor 9 installed in the operation chamber 6 and fixedly connected to the drive shaft 2, a torque transmitting section 10 and a valve mechanism 11 for controlling a flow rate of viscous fluid flowing from the reservoir 5 to the operation chamber 6.

The torque transmitting section 10 includes a plurality of first annular projections 13 concentrically formed on an outer periphery portion of a driven wheel 12 facing with the rotor 9 and a plurality of second annular projections 14 formed on the rotor so as to be overlappedly or engagedly adjacent to the first annular projections 13 of the driven wheel 12. The torque transmitting section 10 is arranged so that a part of the torque transmitting section 10 is located inside of an inner surface 5a of the reservoir 5 with respect to a center axis C of the viscous fluid coupling 1. The viscous fluid is sealingly stored in the reservoir 5 and the operation chamber 6, and the torque transmitting operation at the torque transmitting section 10 is executed through the viscous fluid.

The housing 4 includes a housing body member 21 which is rotatably supported by the drive shaft 2 and a cover member 23 which is installed to a front portion of the housing body member 21 by means of bolts 22. The cover member 23 includes a circular recess portion 24 for defining the reservoir 5 and a ring-shaped flange portion 26 having a return passage 25 for returning (draining) viscous fluid from the operation chamber 6. The flange portion 26 is formed at a peripheral side with respect to the circular recess portion 24. The operation plate 8 is installed to the flange portion 26 so as to close the recess portion 24.

Figure 2:
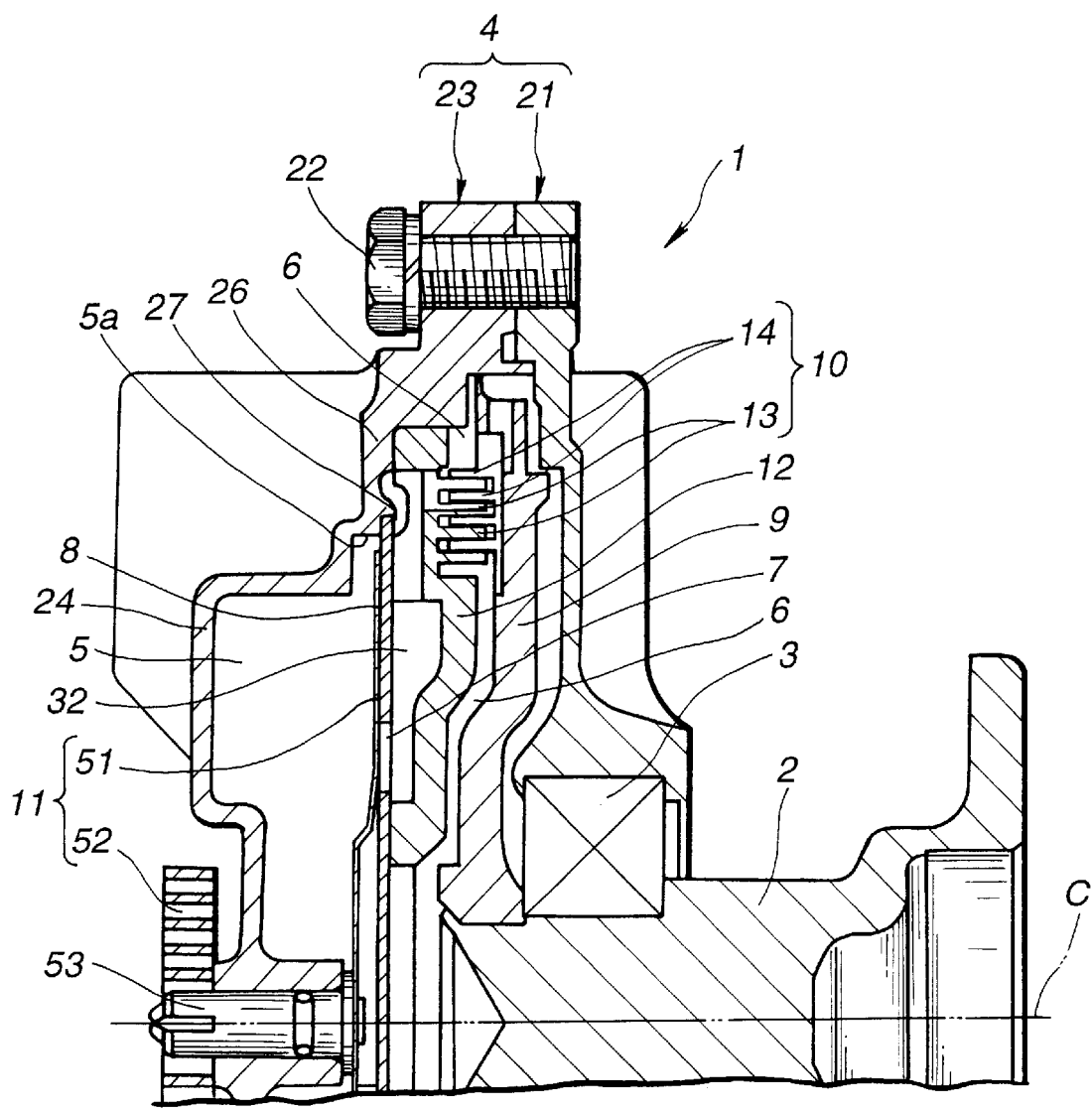
FIG. 2 is an enlarged cross-sectional view of an essential portion of FIG. 1.
Figure 3:
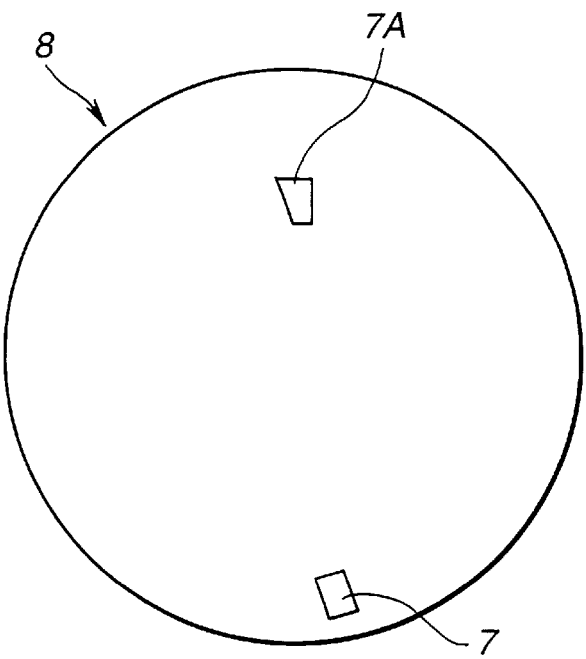
FIG. 3 is a plan view of an operation plate employed in the first embodiment of FIG. 1.

As shown in FIG. 3, the operation plate 8 is made of metal and is formed into a generally disc shape. The first and second holes 7 and 7A are formed on the operation plate 8 so as to fluidly communicate the reservoir 5 and the operation chamber 6. As shown in FIG. 2, the outer peripheral portion of the operation plate 8 is fixedly connected to the flange portion 26 of the cover member 23 through four caulking portions 27 by means of caulking so as to close an opening of the recess portion 24 of the cover member 23. The four caulking portions 27 are formed on the flange portion 26 at equal intervals.

A first surface of the operation plate 8 is faced with the reservoir 5 and is partially covered with a valve plate 51 of a valve mechanism 11. The valve plate 51 is arranged to open and close the first and second holes 7 and 7A of the operation plate 8. A second surface of the operation plate 8 is faced with the operation chamber 6 and is connected to a driven wheel 12. More specifically, the driven wheel 12 is overlapped on the second surface of the operation plate 8 and is fixed to the cover member 23 by means of a plurality of bolts 28.

Figure 4:
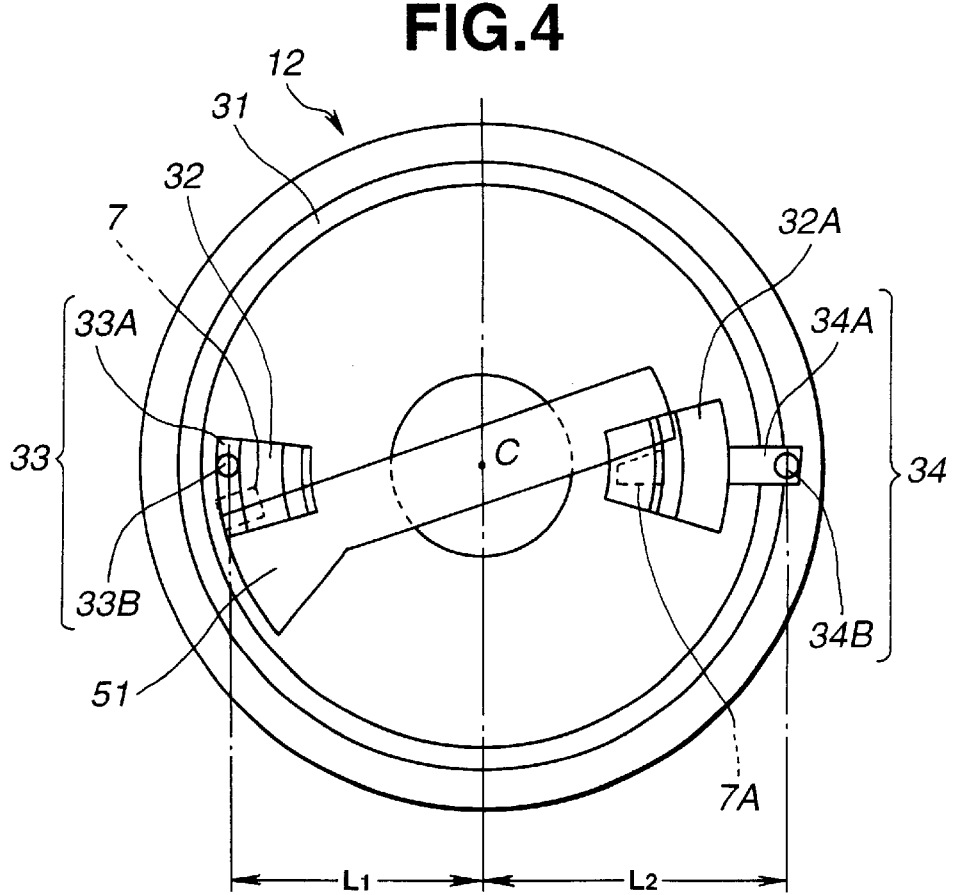
FIG. 4 is a plan view showing a first surface of a driven wheel employed in the first embodiment.

As shown in FIG. 4, formed on a surface of the driven wheel 12 covering the operation plate 8 are a recess portion 31 for engaging the caulking portion 27, first and second sector-shaped auxiliary chambers 32 and 32A communicated with the first and second holes 7 and 7A respectively, and first and second passages 33 and 34 communicating the first and second auxiliary chambers 32 and 32A with the torque transmitting portion 10.

The recess portion 31 is formed circular in shape. When the driven wheel 12 is set on the operation plate 8 during assembly steps, the caulking connecting portion 27 are set in the recess portion 31 so that the second surface of the operation plate 8 is fitted with the driven wheel 12. The driven wheel 12 is set on the operation plate 8 so that the first and second auxiliary chambers 32 and 32A are located at the positions of the first and second holes 7 and 7A. The first and second auxiliary chambers 32 and 32A are formed such that cross-sectional areas of them are greater than those of the first and second holes 7 and 7A. This arrangement functions to smoothly flow the viscous fluid from the holes 7 and 7A to the torque transmitting section 10. The first passage 33 includes a first passage portion 33A through which the viscous fluid flows from the first hole 7 to the outer peripheral portion of the driven wheel 12, and a first passage portion 33B formed at a tip end portion of the first passage portion 33A. The second passage 34 includes a second passage portion 34A through which the viscous fluid flows from the first hole 7 to the outer peripheral portion of the driven wheel 12, and a second passage portion 34B formed at a tip end portion of the second lateral passage 34A.

As shown in FIG. 4, a distance L1 between a center of the driven wheel 12 and the first passage portion 33B is different from a distance L2 between the center of the driven wheel 12 and the second passage portion 34B. Therefore, the timing that the viscous fluid is supplied to the torque transmitting section 10 through the first passage 33 is different from the timing that the viscous fluid is supplied to the torque transmitting section 10 through the second passage 34. This difference generates variations as to the operation characteristics.

Figure 5:
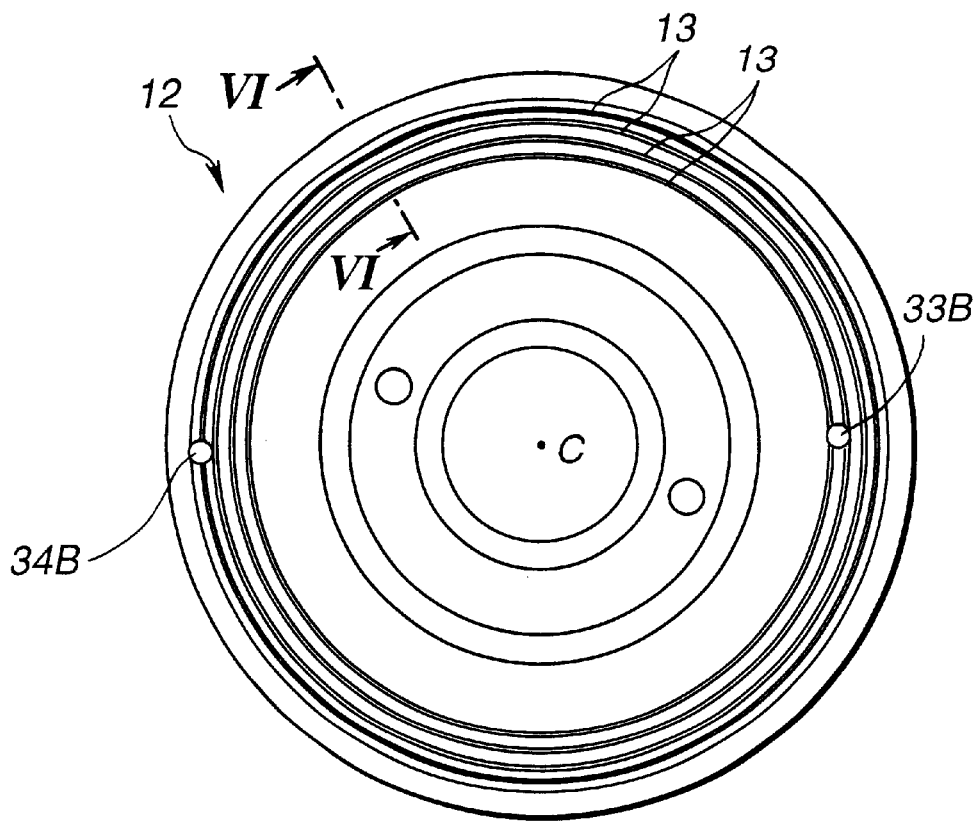
FIG. 5 is a plan view showing a second surface of the driven wheel.
Figure 6:
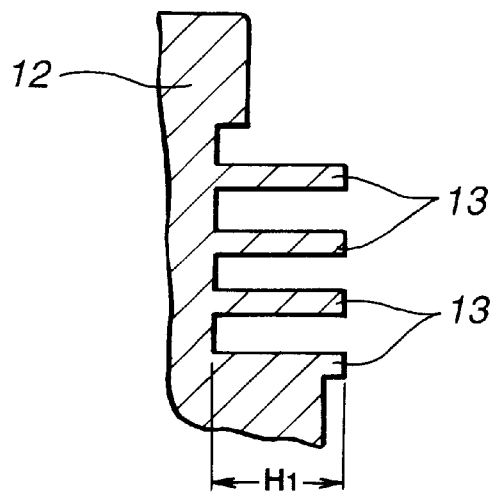
FIG. 6 is a cross-sectional view taken in the direction of section line VI—VI of FIG. 5.

As shown in FIGS. 5 and 6, the first annular projections 13 are concentrically formed on the other surface of the driven wheel 12. The first annular projections 13 constitute a part of the torque transmitting section 10. The first annular projections 13 are set at the same height H1.

Figure 7:
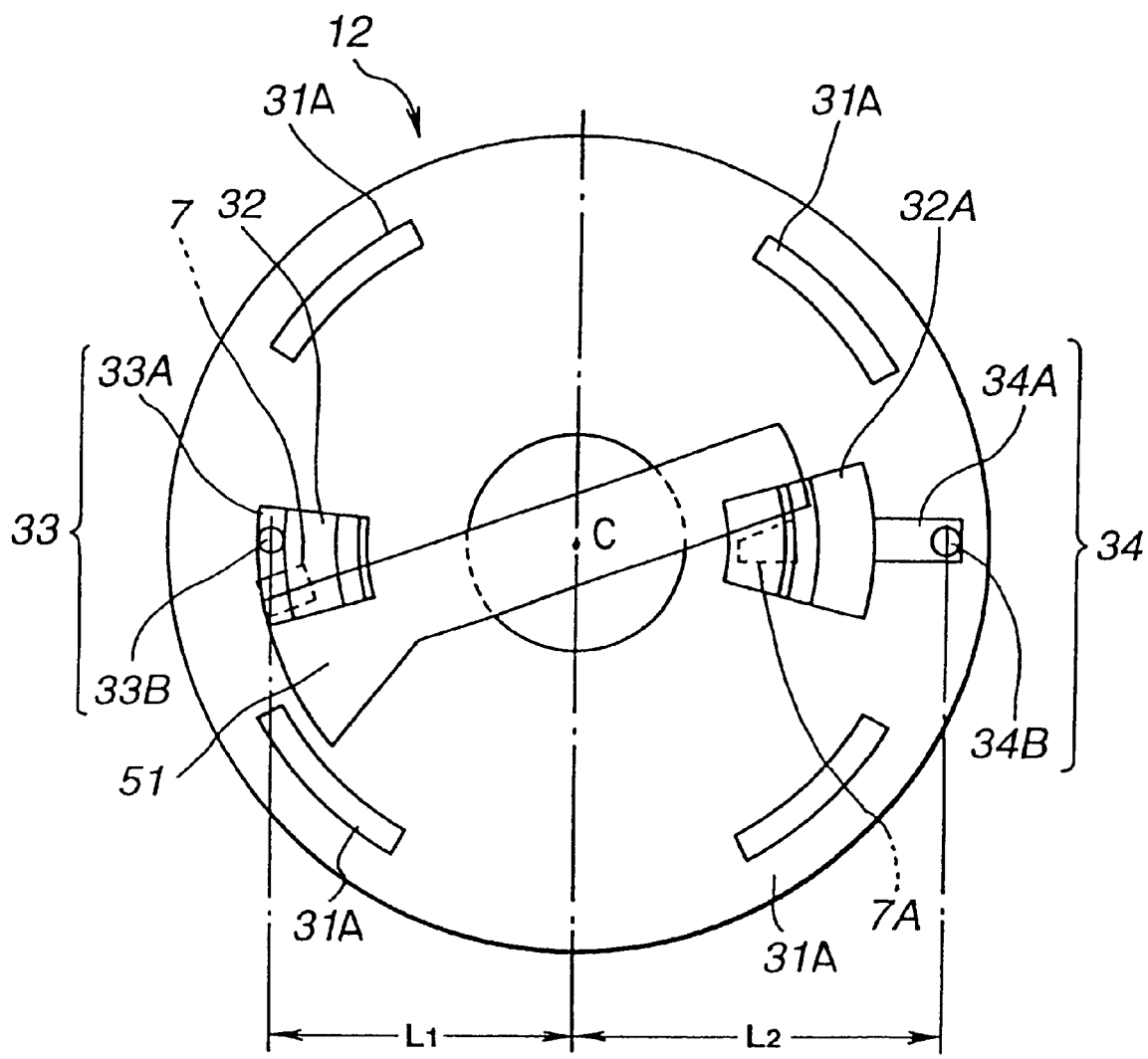
FIG. 7 is a plan view showing a modification of the driven wheel of the first embodiment.

FIG. 7 shows a modification of the driven wheel 12. In this modification, arc-shaped four recess portions 31A for receiving the caulking connecting portions 27 are formed at positions corresponding to the four caulking connecting portions 27. This modified structure of the recess portions 31A decreases a volume of a space of the recess portions 31 as compared with the annular recess portion 31 and therefore suppresses the increase of the total volume of the viscous fluid.

Figure 8:
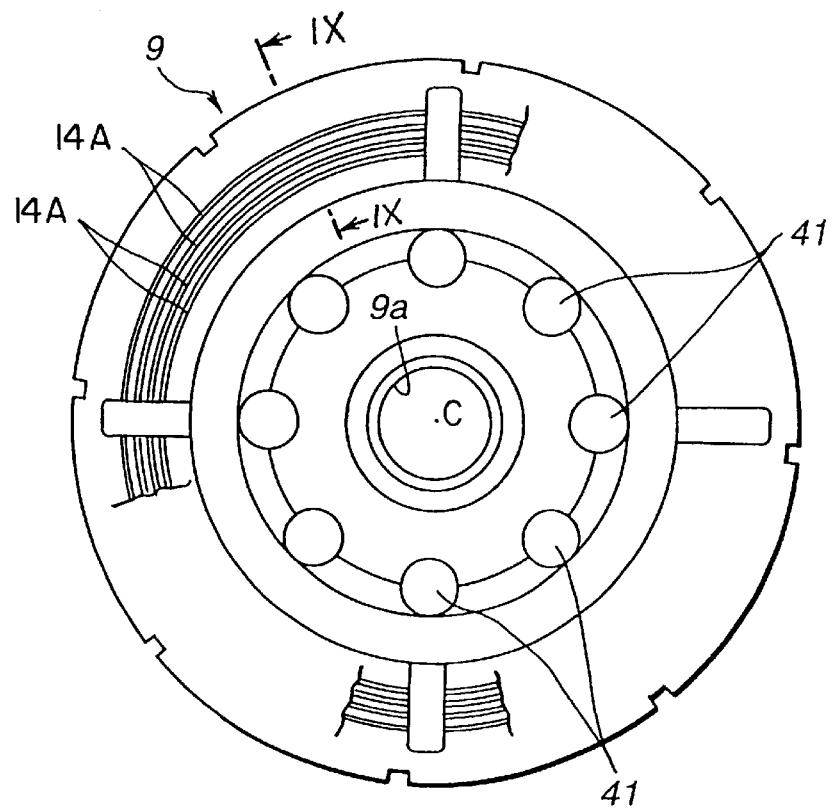
FIG. 8 is a plan view of the rotor of the first embodiment.
Figure 9:
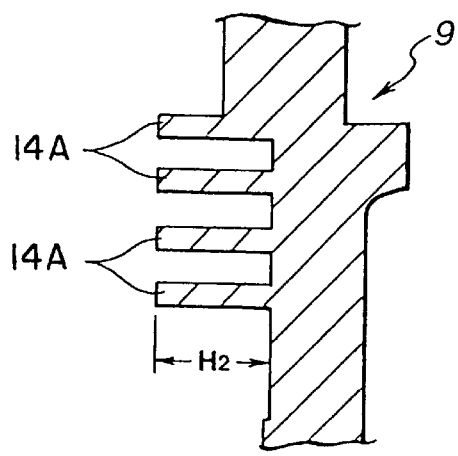
FIG. 9 is a cross-sectional view taken in the direction of the arrows IX—IX of FIG. 8.

As shown in FIGS. 8 and 9, the rotor 9 includes a bearing hole 9a at the center portion thereof. A tip end portion of the drive shaft 2 is inserted to the bearing hole 9a and is fixed to the drive shaft 2 by enlarging a peripheral portion thereof. The second annular projections 14A constituting a part of the torque transmitting section 10 are concentrically formed on a surface of the driven wheel 12 faced with the rotor 9. The second annular projections 14A are set at the same height H2, and the height H2 of the second annular projections 14A is generally the same as the height HI of the first annular projections 13. The rotor 9 has a plurality of lightening or weight reducing holes 41 around the bearing hole 9a as shown in FIG. 8.

As shown in FIG. 1, the valve mechanism 11 is fittingly set on the operation plate 8. The valve mechanism 11 includes a valve plate 51 for opening and closing the first and second holes 7 and 7A and a coiled bimetal 52 for driving the valve plate 51 according to the temperature thereof. The bimetal 52 is installed at a center portion of the cover member 23 and is connected to the valve plate 51 through a rotation shaft 53. Therefore, when ambient temperature around the housing 4 and the bimetal 52 rises as high as a predetermined temperature, the bimetal 52 extends to rotate the valve plate 51 in a direction through the rotation shaft 52. By this rotation of the valve plate 51, the first and second holes 7 and 7A are sequentially opened. On the other hand, when ambient temperature around the housing 4 and the bimetal 52 falls to a predetermined temperature, the bimetal 52 is compressed to rotate the valve plate 51 in the other direction. By the reverse rotation of the valve plate 51, the first and second holes 7 and 7A are sequentially closed.

Next, the manner of operation of the viscous fluid coupling will be discussed.

During the engine stopping period, the viscous fluid is stayed in the reservoir 5, the operation chamber 6 and a fluid storing space formed backside of the rotor 9 while keeping the same liquid level. When the engine E is started, the drive shaft 2 and the rotor 9 are rotated by a crankshaft of the engine E. When the ambient temperature around the housing 4 is lower than the predetermined temperature, the valve mechanism 11 is set at a close position wherein the first and second holes 7 and 7A of the operation plate 8 are closed by the valve plate 51 so as to stop the circulation of the viscous fluid. Therefore, a flow rate supplied to the torque transmitting section 10 is decreased and therefore the torque transmission from the rotor 9 to the housing 4 is decreased so as to prevent a cooling fan from rotating.

When the ambient temperature around the housing 4 rises as high as the predetermined temperature, the first and second holes 7 and 7A are opened by the opening operation of the valve mechanism 11. Therefore, the viscous fluid flows from the reservoir 5 to the operation chamber 6 and the torque transmitting section 10, and therefore the torque transmission from the rotor 9 to the housing 4 is increased so as to rotate the cooling fan in high speed. This high-speed rotation of the cooling fan sufficiently cools a radiator of the engine E.

Figure 10:
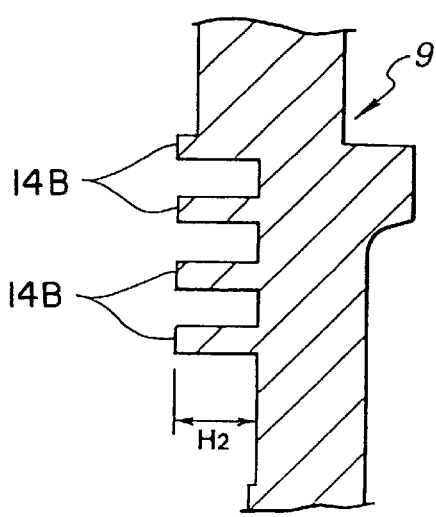
FIG. 10 is a cross-sectional view of first annular projections of the rotor employed in a second embodiment.

Referring to FIG. 10, there is shown a second embodiment of the viscous fluid coupling 1 according to the present invention. The second embodiment is generally the same as the first embodiment except that the height H2 of the second annular projections 14B of the rotor 9 is shorter than that of the second annular projections 14A of the first embodiment. More specifically, the height H2 of the second annular projections 14B of the second embodiment is set from one-half to two-third of the height H1 of the first annular projections 13 of the driven wheel 12. The manner of operation of the viscous fluid coupling 1 of the second embodiment is basically the same as that of the first embodiment. Therefore, the explanation thereof is omitted herein. In addition to the advantages of the first embodiment, the second embodiment ensures a further advantages. That is, since the second embodiment of the viscous fluid coupling 1 according to the present invention is arranged such that the height H2 of the second annular projections 14B is set from one-half to two-third of the height H1 of the first annular projections 13 of the driven wheel 12, the viscous fluid is further effectively discharged from the torque transmitting section 10 while suppressing the torque transmission quantity of the torque transmitting section 10. This further suppresses the generation of a dragging rotation of the cooling fan at the start of the engine E and decreases the time for the dragging rotation of the cooling fan. Further, an overshoot rotation during the engine accelerating state is reduced.

Figure 11:
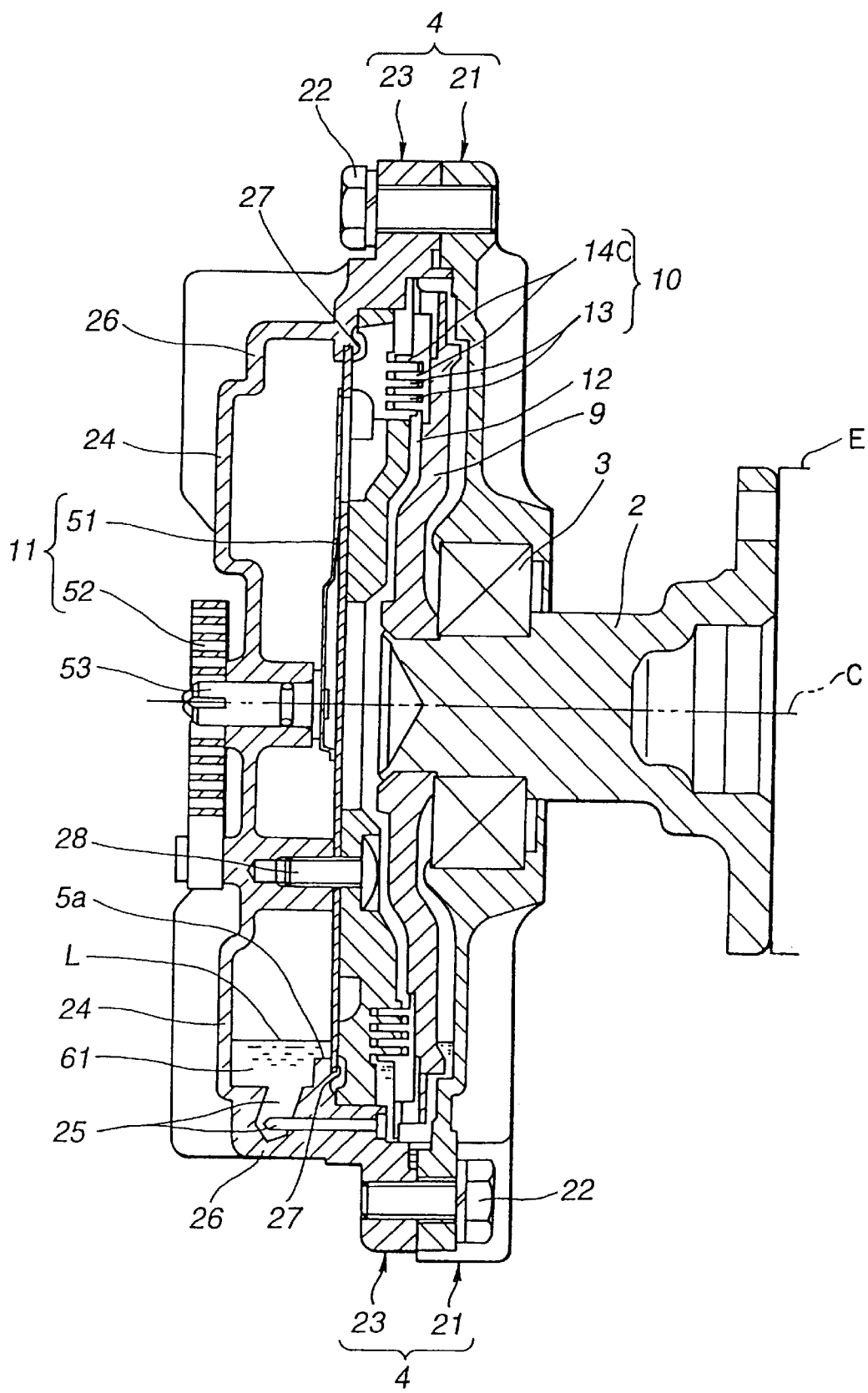
FIG. 11 is a cross-sectional view of the viscous fluid coupling of the third embodiment according to the present invention.
Figure 12:
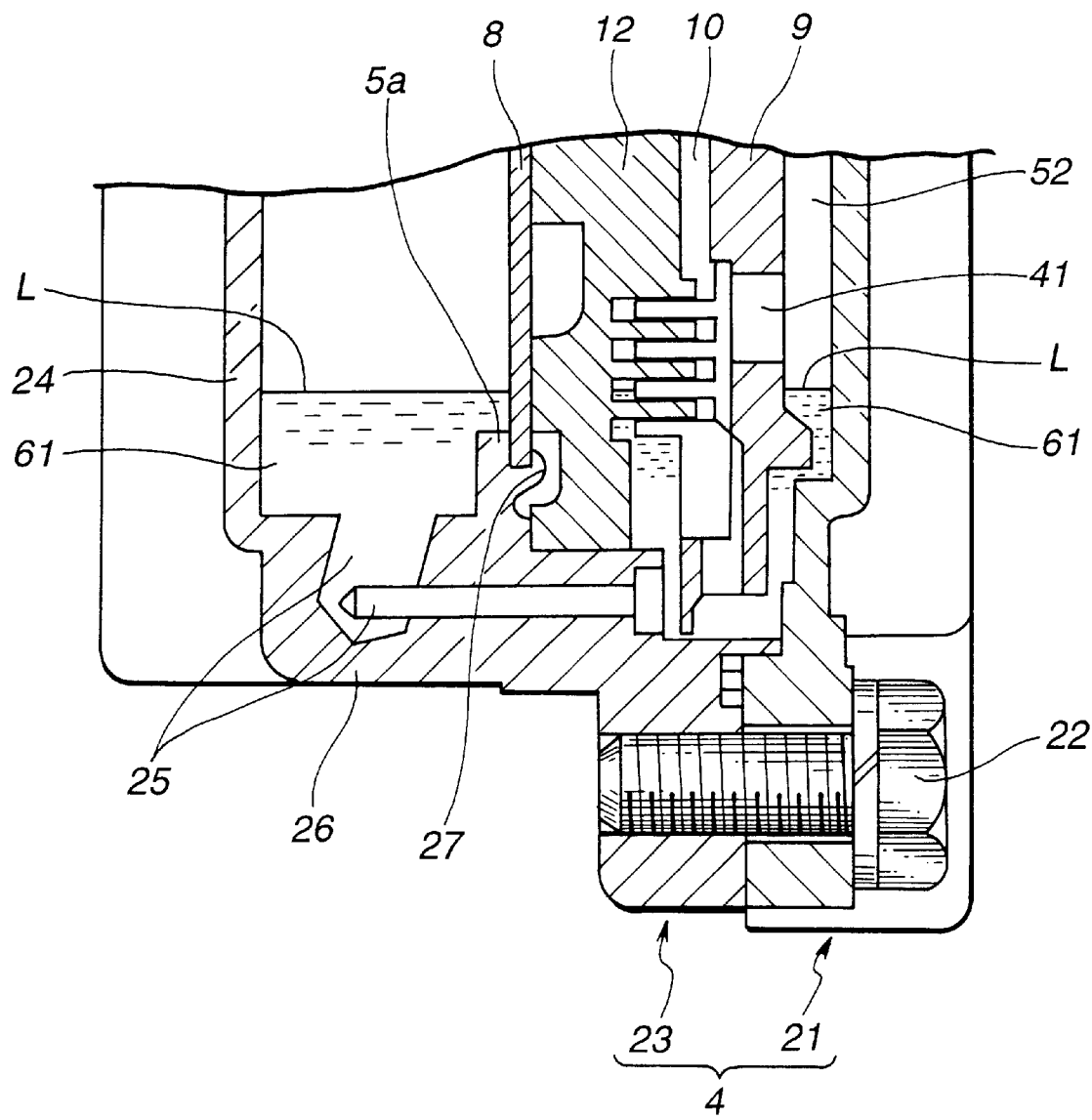
FIG. 12 is an enlarged cross-sectional view of an essential portion of FIG. 11.

Referring to FIGS. 11 and 12, there is shown a third embodiment of the viscous fluid coupling 1 according to the present invention. In this third embodiment, the viscous fluid coupling 1 is arranged such that the torque transmitting section 10 is formed at a height level higher than a fluid level L of the viscous fluid 61 stayed in the reservoir 5 when the engine E is stopping. Further, the lightening holes 41 are through-holes penetrating the rotor 9 in the thickness direction. The lightening holes 41 are formed to be located at a height level higher than the liquid lever L of the viscous fluid 61 during the engine stopping state. This arrangement of the lightening holes 41 functions to prevent the viscous fluid 61 from flowing from the liquid storage space 52 to the torque transmitting section 10 though the lightening holes 41. In this embodiment the annular projections are denoted by 14C. The other construction of the viscous fluid coupling 1 of the third embodiment is the same as that of the first embodiment. Therefore the explanation thereof is omitted herein.

Although the third embodiment according to the present invention has been shown and described such that the lightening holes 41 are formed to penetrate the rotor 9, it will be understood that the lightening holes 41 may be arranged to be blind and not to completely penetrate the rotor 9. If the lightening holes 41 are arranged not to penetrate the rotor 9, the lightening holes 41 may be located at a position lower than the liquid level.

Figure 13:
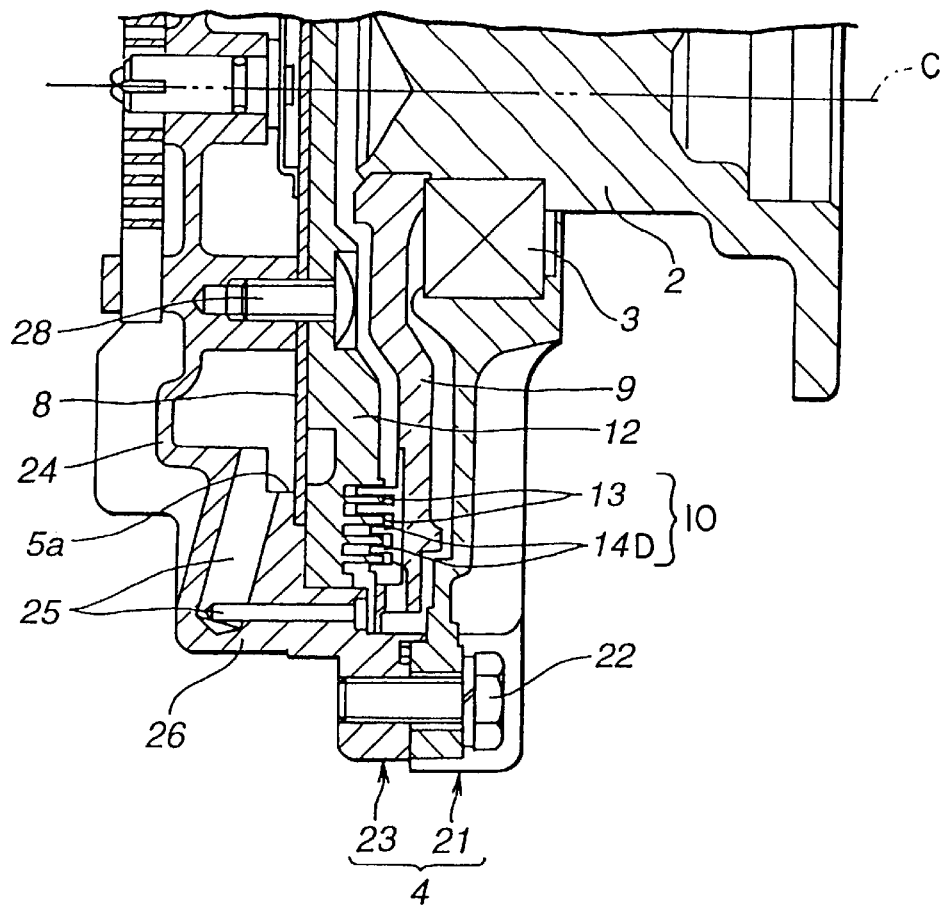
FIG. 13 is an enlarged cross-sectional view of an essential portion of the fluid coupling of a fourth embodiment according to the present invention.
Figure 14:
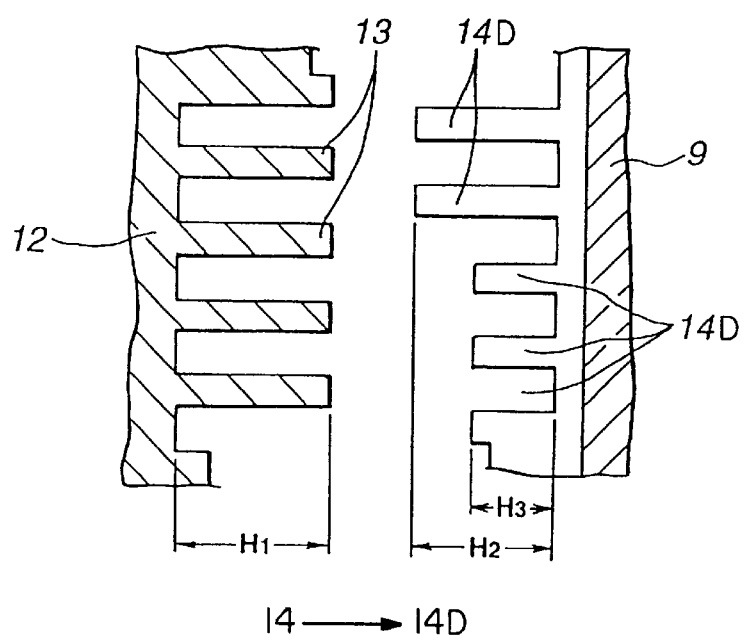
FIG. 14 is an enlarged cross-sectional view of the first and second annular projections of the fourth embodiment.

Referring to FIGS. 13 and 14, there is shown a fourth embodiment of the viscous fluid coupling 1 according to the present invention. The construction of the fourth embodiment is generally the same as that of the first embodiment except that the height of the second annular projections 14D of the rotor 9 is arranged such that the height of the diametrically or radially inner-side second annular projections 14D is set as high as the height of the first annular projections 13, and the height H3 of the diametrically or radially outer-side second annular projections 14D is set from one-half to two-third of the height H1. More specifically, the overlapped portion between the first annular projections 13 and the second annular projections 14D is varied such that the diametrical overlapped amount at an outer side of the overlapped portion is set from one-half to two-third of the overlapped amount at the inner side. With this arrangement of the fourth embodiment, the discharging of the viscous fluid from the outer peripheral portion of the torque transmitting section 10 is facilitated and quickly executed. Therefore, even when the outer peripheral portion of the torque transmitting section 10 is dipped in the viscous fluid by the stopping of the engine E, the remaining viscous fluid in the outer peripheral portion of the torque transmitting section 10 is easily discharged by starting the engine E. This suppresses the dragging rotation of the cooling fan. Since the other construction of the fourth embodiment is the same as that of the first embodiment, the explanation thereof is omitted herein.

Figure 15:
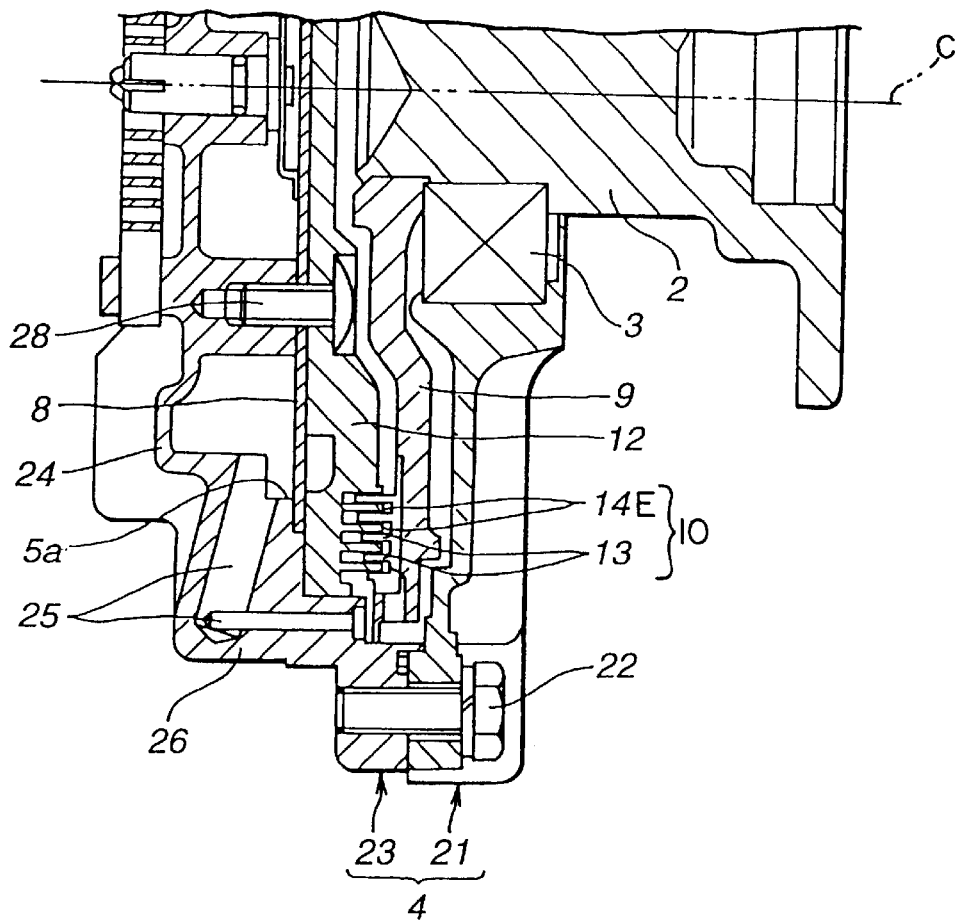
FIG. 15 is an enlarged essential portion of the fluid coupling of a fifth embodiment according to the present invention.
Figure 16:
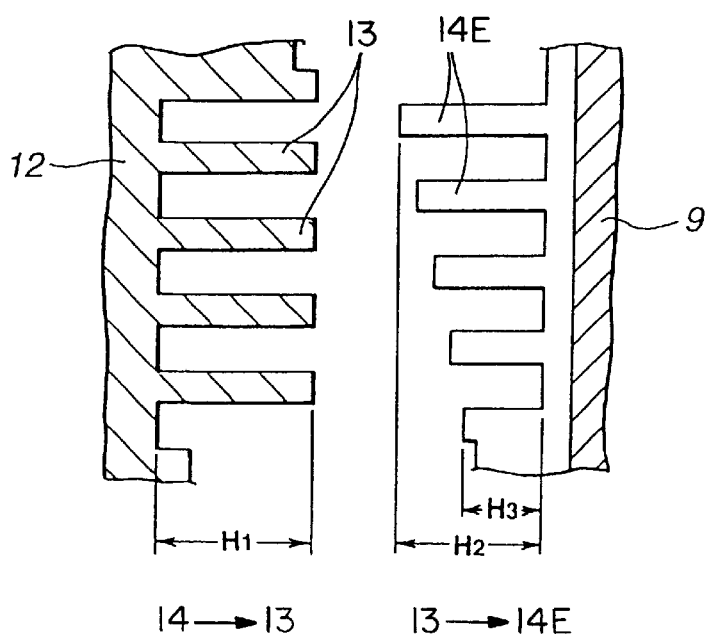
FIG. 16 is an enlarged cross-sectional view of the first and second annular projections of the fifth embodiment.

Referring to FIGS. 15 and 16, there is shown a fifth embodiment of the viscous fluid coupling 1 according to the present invention. The construction of this fifth embodiment is also generally the same as that of the first embodiment except that the height H2 of the second annular projections 14E are different from those of the first embodiment. More specifically, the second annular projections 14E formed on the rotor 9 are arranged such that the height H2 of the second annular projections 14E are gradually decreased from the inner side to the outer side in the diametrical direction as shown in FIG. 16. The height H2 of the innermost second annular projection 14E is generally the same as the height H1 of the first annular projections 13. The height H2 of the outermost second annular projection 14E is set from one-half to two-third of the height H1. The height H1 of the first annular projections 13 of this fifth embodiment are constant from the inner side to the outer side in the diametrical direction as same as that of the first embodiment.

That is, the overlapped amount between the first annular projection 13 and the second annular projections 14E are gradually decreased from inside to outside in the diametrical direction. Therefore, the viscous fluid discharging function is improved toward the outer peripheral side. The other construction of the fifth embodiment is the same as that of the first embodiment, and therefore the explanation thereof is omitted herein.

Figure 17:
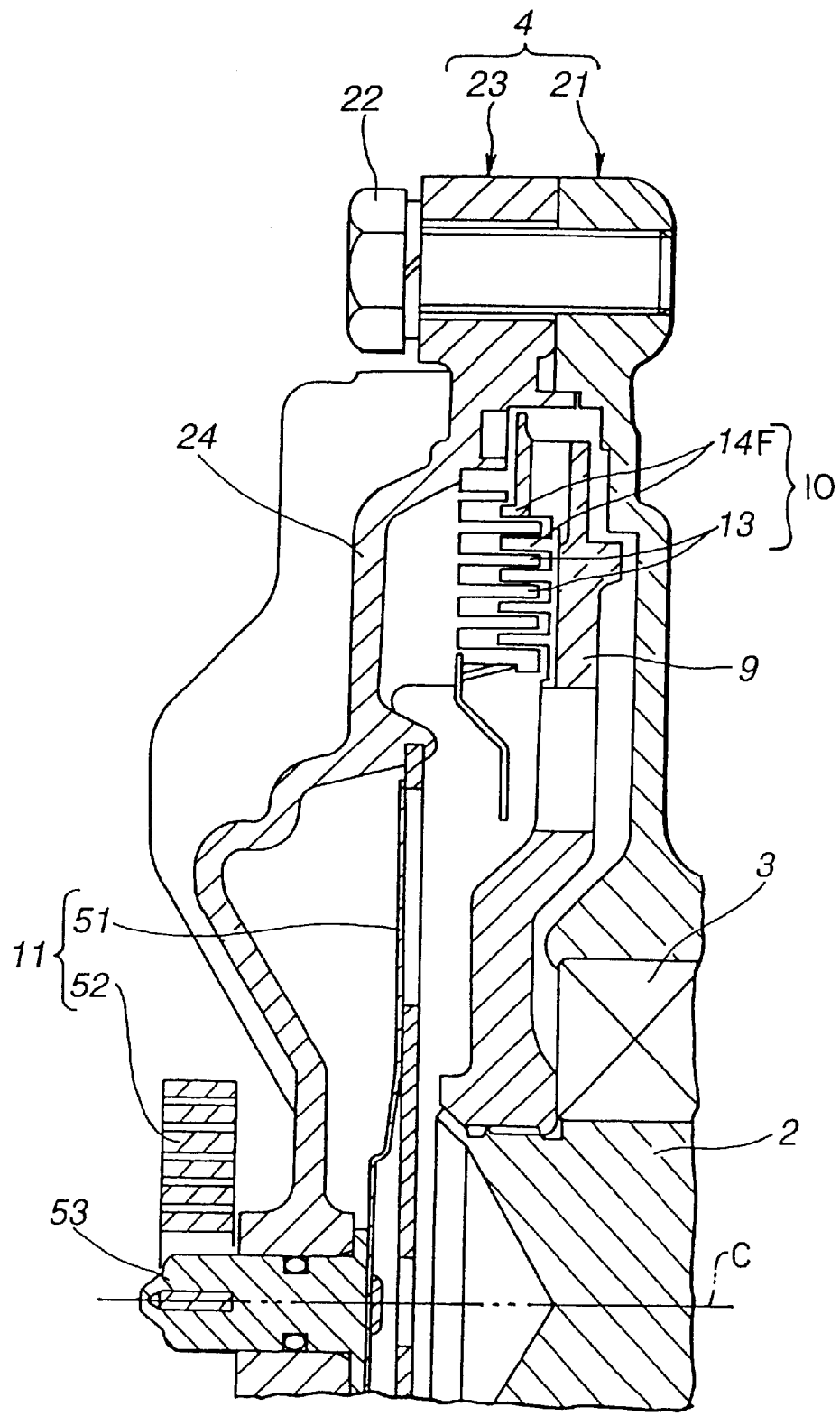
FIG. 17 is an enlarged cross-sectional view of an essential portion of a modification of the fifth embodiment according to the present invention.
Figure 18:
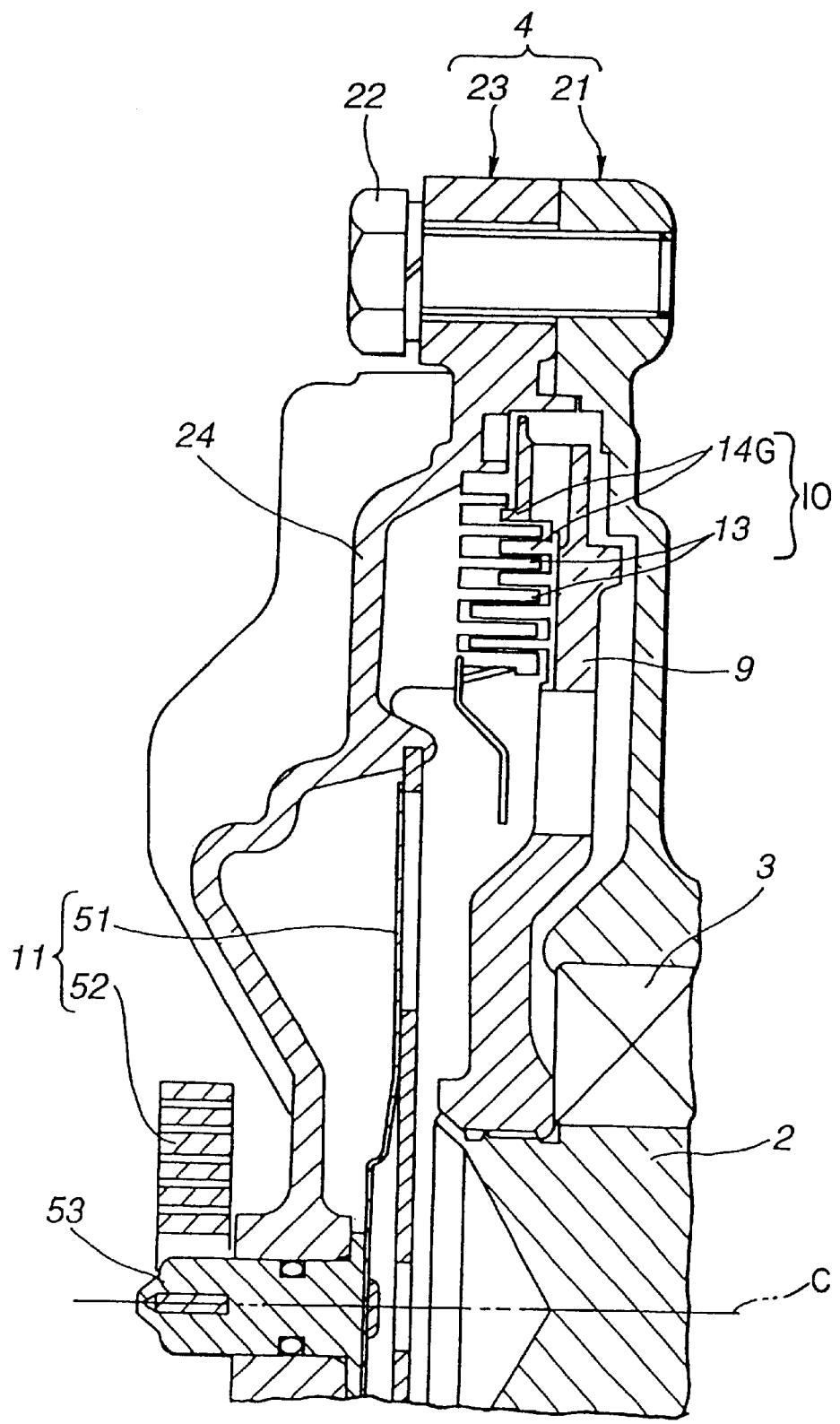
FIG. 18 is an enlarged cross-sectional view of an essential portion of another modification of the fifth embodiment according to the present invention.
Figure 19:
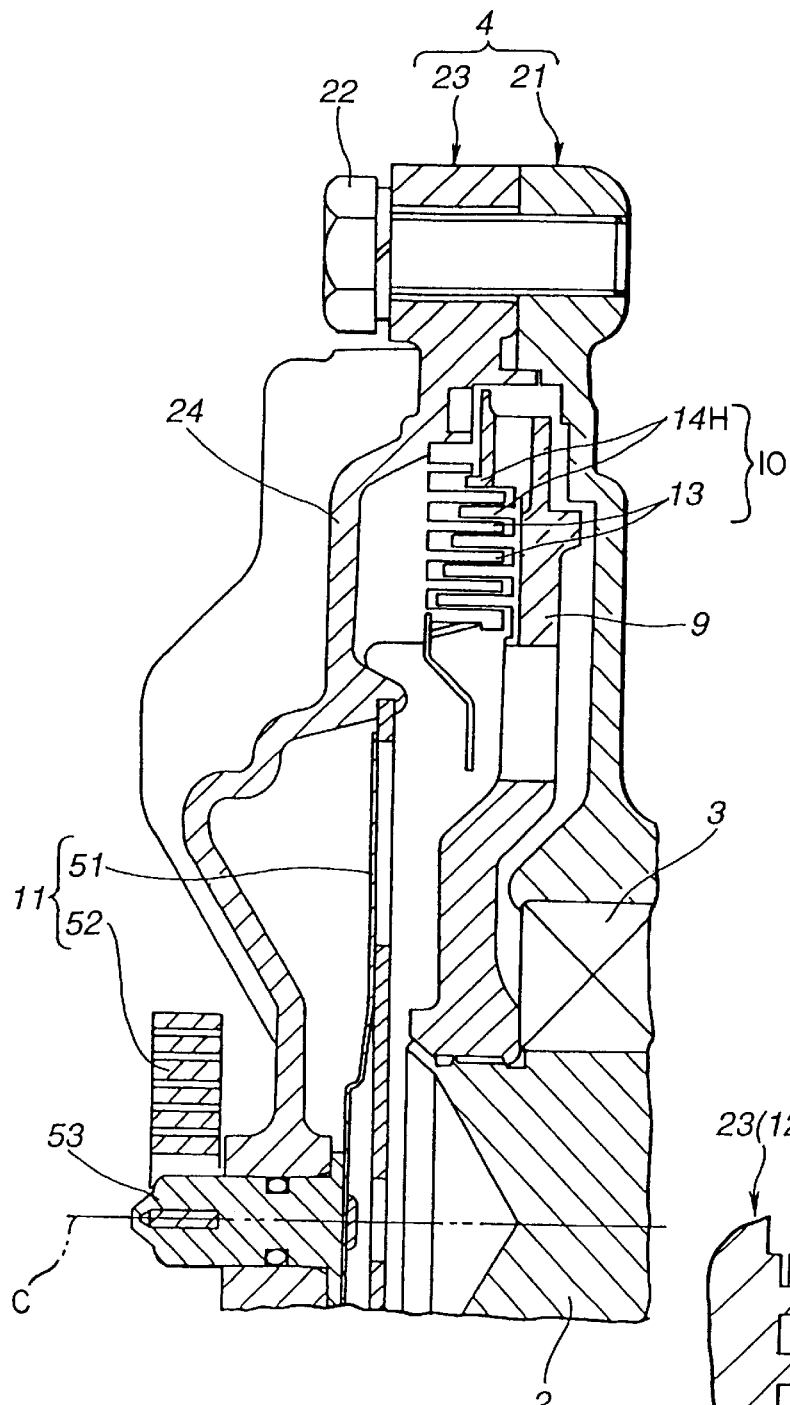
FIG. 19 is an enlarged cross-sectional view of an essential portion of another modification of the fifth embodiment according to the present invention.
Figure 20:
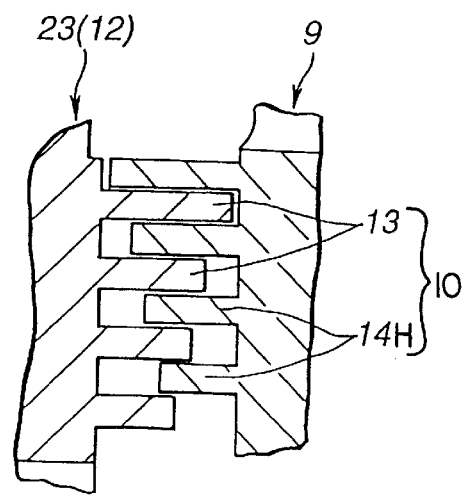
FIG. 20 is an enlarged cross-sectional view of the first and second annular projections of another embodiment according to the present invention.
Figure 21:
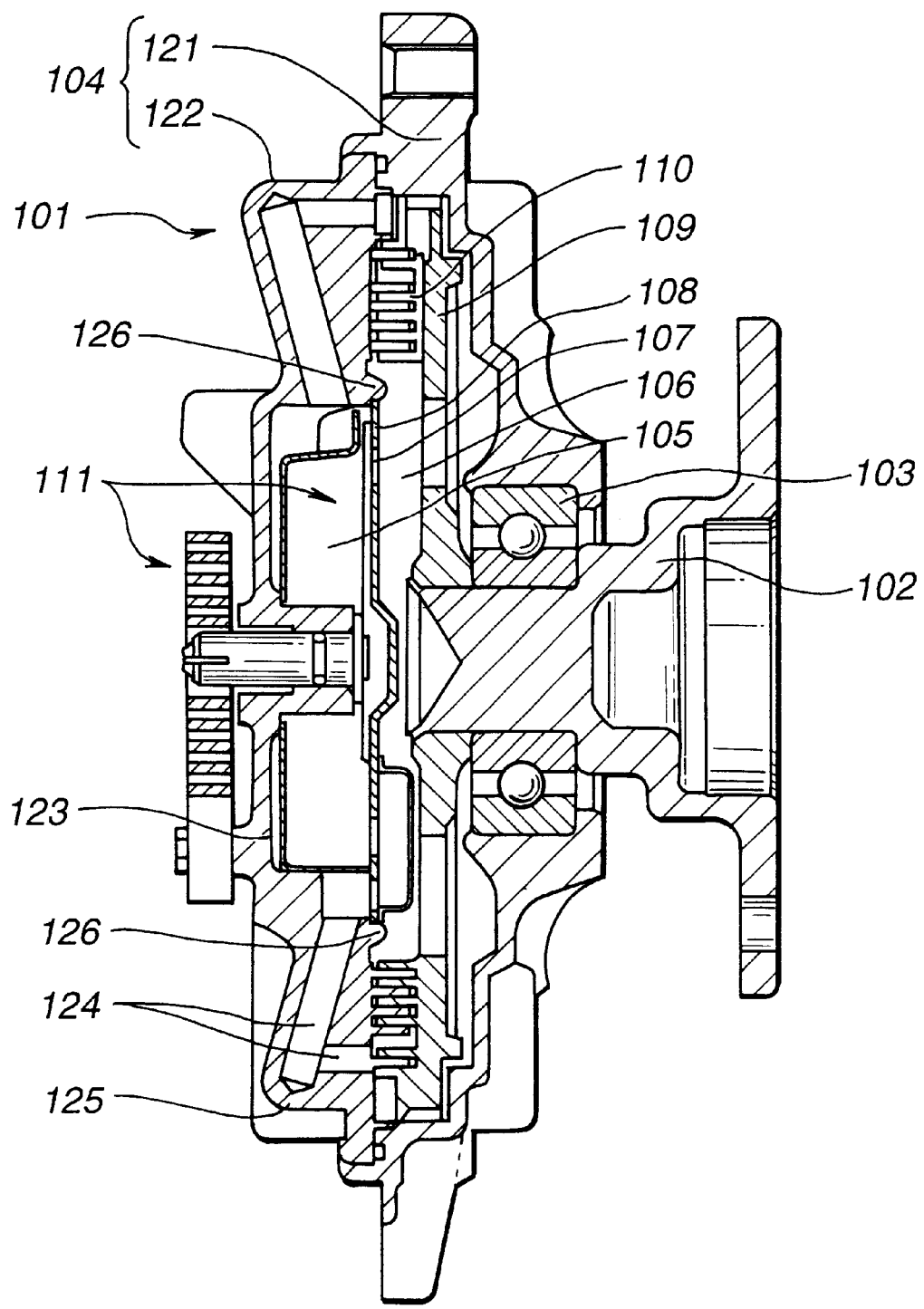
FIG. 21 is a cross-sectional view of a conventional viscous fluid coupling.
Figure 22:
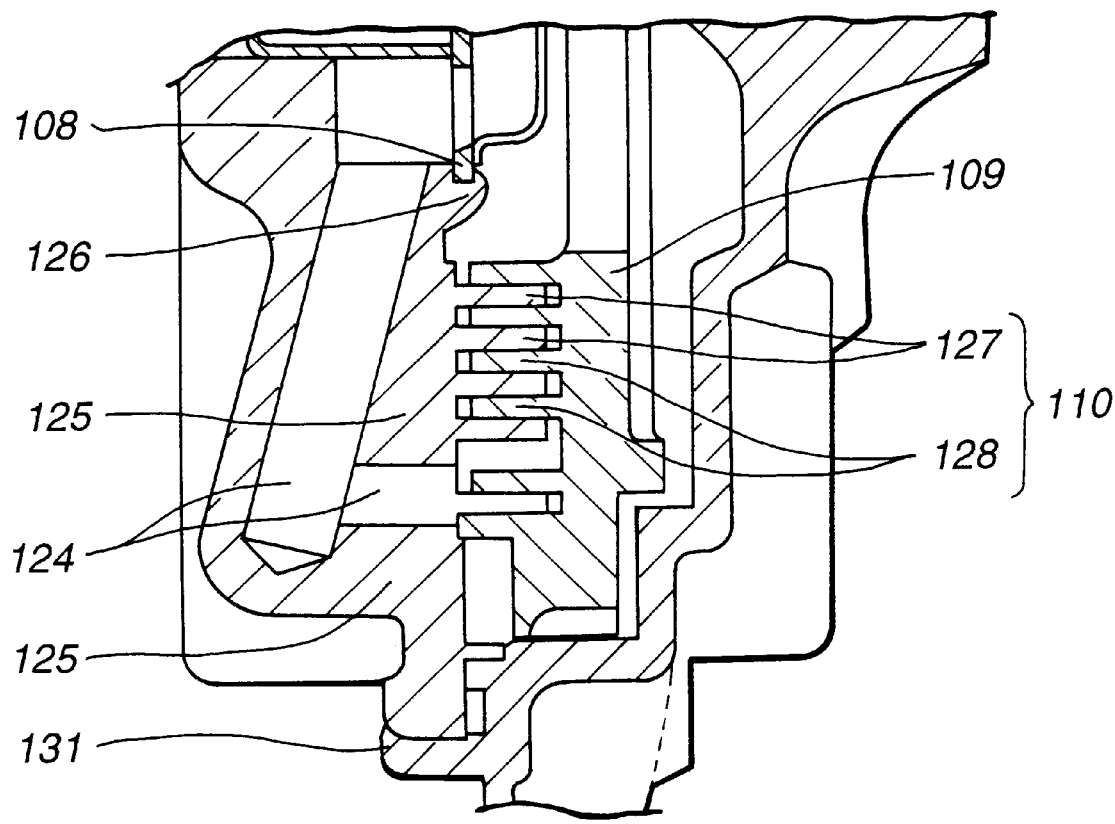
FIG. 22 is an enlarged cross-sectional view of a portion of FIG. 21.

Although the first to fifth embodiments have been shown and described such that the first annular projections 13 are formed on the driven wheel 12, it will be understood that the first annular projections 13 may be formed on the cover member 23 or the housing body member 21 as shown in the sixth to eighth embodiments shown in FIGS. 17 to 19. Furthermore, it will be understood that the first and second annular projections 13 and 14(F–H) may be respectively arranged such that both of the height H1 of the first annular projections 13 and the height H2 of the second annular projections 14(F–H) are gradually decreased from inside to outside in the diametrical direction as shown in FIG. 20. This arrangement also decreases the overlapped amount between the first and second annular projections 13 and 14F toward the outer peripheral side.

What is claimed is:

1. A viscous fluid coupling connected to an engine, comprising: a drive shaft connected to a rotation shaft of the engine; a housing rotatably supported to said drive shaft;
    an operation plate set in said housing and dividing a space defined by said housing into a reservoir and an operation chamber, said operation plate comprising a communication hole communicating the reservoir and the operation chamber;
    viscous fluid in the reservoir and the operation chamber;
    a rotor disposed in the operation chamber and being fixed to said drive shaft;
    a valve mechanism closing and opening the communication hole according to ambient temperature of said housing to control a flow rate of said viscous fluid from the reservoir to the operation chamber;
    a driven wheel fixed to said housing and being located between said operation plate and said rotor; and
    a torque transmitting section including a plurality of first annular projections concentrically formed on an outer peripheral portion of said driven wheel and a plurality of second annular projections concentrically formed on an outer peripheral portion of said rotor, the first annular projections being overlappedly adjacent with the second annular projections and being fluidly coupled with the second annular projections through said viscous fluid, a part of said torque transmitting section being located inside of an outermost portion of the reservoir in a radial direction.

2. A viscous fluid coupling as claimed in claim 1, wherein said torque transmitting section is located at a position higher in height level than a fluid level of said viscous fluid when the engine is stopped.

3. A viscous fluid coupling as claimed in claim 1, wherein said rotor comprises lightening holes which penetrate said rotor in its thickness direction, the lightening holes being located at a position higher in height level than a fluid level of said viscous fluid when the engine is stopped.

4. A viscous fluid coupling as claimed in claim 1, wherein the first annular projections and the second annular projections are arranged such that an overlapped amount therebetween at an outer side in the diametrical direction is smaller than the overlapped amount at an inner side in the diametrical direction.

5. A viscous fluid coupling as claimed in claim 1, wherein said driven wheel is installed to said housing so that an auxiliary chamber is located at a position of the communication hole.

6. A viscous fluid coupling as claimed in claim 1, wherein said operation plate is fixed to said housing through caulking portions of said housing, said driven wheel having an annular groove for receiving the caulking portion.

7. A viscous fluid coupling as claimed in claim 1, wherein said operation plate is fixed to said housing through caulked portions by means of caulking connection.

8. A viscous fluid coupling as claimed in claim 7, wherein the caulked portions are formed at equal intervals.

9. A viscous fluid coupling as claimed in claim 1, wherein the communication hole is communicated with said torque transmitting section through an auxiliary chamber formed between said operation plate and said driven wheel.

10. A viscous fluid coupling as claimed in claim 9, wherein the auxiliary chamber comprises a plurality of auxiliary chambers which are communicated with said torque transmitting section through passages, respectively, the passages being located at positions which are different in distance from an axial center of said driven wheel.

11. A viscous fluid coupling as claimed in claim 9, wherein the auxiliary chamber is formed into a sector shape.

12. A viscous fluid coupling as claimed in claim 9, wherein a cross-sectional area of the auxiliary chamber is greater than the cross-sectional area of the communication hole of said operation plate.

13. A viscous fluid coupling as claimed in claim 1, wherein said driven wheel is overlapped with said operation plate, said driven wheel and said operation plate being fixed to said housing by means of a plurality of bolts.

14. A viscous fluid coupling as claimed in claim 1, wherein said operation plate is fixed to said housing by means of caulking connection, at least one annular groove for the caulking connection is circumferentially formed on a surface of said driven wheel facing with said operation plate.

15. A viscous fluid coupling as claimed in claim 1, wherein said rotor comprises a lightening hole.

16. A viscous fluid coupling as claimed in claim 1, wherein said valve mechanism comprises a valve plate fittingly set on said operation plate and a coiled bimetal for driving the valve plate.

17. A viscous fluid coupling as claimed in claim 1, wherein said housing comprises a housing body member and a cover member.

\* \* \* \* \*